May 29, 1923.

H. G. SELLMAN

MOLD FOR CONCRETE STRUCTURES

Filed Oct. 2, 1919

Inventor

Henry G. Sellman

By

Attorney

May 29, 1923. 1,457,089
H. G. SELLMAN
MOLD FOR CONCRETE STRUCTURES
Filed Oct. 2, 1919 2 Sheets-Sheet 2
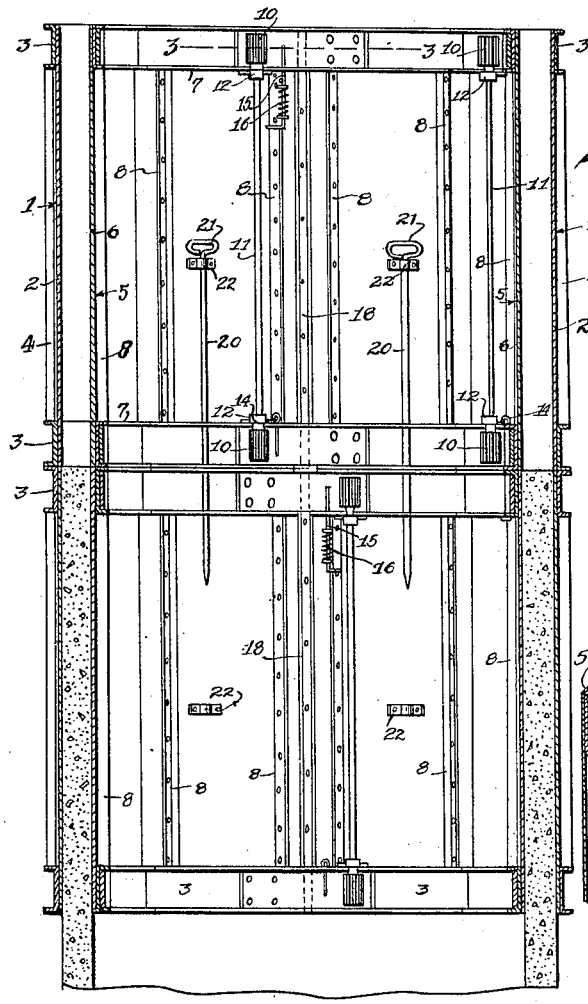

Patented May 29, 1923.

1,457,089

UNITED STATES PATENT OFFICE.

HENRY G. SELLMAN, OF DETROIT, MICHIGAN.

MOLD FOR CONCRETE STRUCTURES.

Application filed October 2, 1919. Serial No. 327,872.

*To all whom it may concern:*

Be it known that I, HENRY G. SELLMAN, a citizen of the United States of America, residing at Detroit, in the county of Wayne and State of Michigan, have invented certain new and useful Improvements in Molds for Concrete Structures, of which the following is a specification, reference being had therein to the accompanying drawings.

This invention relates to molds for concrete structures and more particularly to molds for circular hollow structures, such as silos, grain elevators, stacks and the like, and its object is to provide a simple and conveniently manipulated mold structure which is rigid and durable and which has simple and conveniently operable means for expanding and contracting the several sections comprising the mold. A further object is to provide certain other new and useful features in the construction, arrangement and combination of parts, all as hereinafter more fully described.

With the above and other ends in view, the invention consists in the matters hereinafter more fully set forth and particularly pointed out in the appended claims, reference being had to the accompanying drawings in which—

Figure 1 is an end elevation or plan view of the upper end of a mold illustrative of the invention;

Fig. 2 is a vertical longitudinal section, illustrative of the construction and showing two mold sections in superposed relation;

Fig. 3 is an enlarged detail showing expanding and contracting mechanism for the inner mold wall with adjacent portions of the mold walls in horizontal section;

Fig. 4 is a similar detail showing expanding and contracting mechanism for the outer mold wall;

Fig. 5 is a perspective detail of the expanding and contracting mechanism for the inner mold wall;

Fig. 6 is a similar perspective detail showing a modified form of contracting and expanding mechanism; and Fig. 7 is a sectional detail of a portion of a completed silo.

As shown in the drawings, 1 indicates the outer circular wall of a mold, which wall comprises a plurality of sections 2 preferably formed of sheet metal with top and bottom strengthening channel irons 3 secured to each bent sheet metal section or body 2 along the upper and lower edges thereof upon the outer surface of the body, and also vertical angle irons 4 secured to said body surface and extending between the top and bottom channels. The channel irons 3 and angle bars 4 thus form a strengthening and stiffening frame for each sheet metal section or body 2 secured upon the outer surface thereof, thus providing a plain inner mold wall surface to oppose the like surface of an inner circular mold wall 5 which is spaced therefrom and made up of a plurality of sheet metal sections or sheets 6 similar to the sections 2 of the outer wall, which sections 6 are reinforced with top and bottom channel irons 7 and vertical angle bars 8 in a manner similar to the outer wall. The mold thus comprises parallel spaced circular walls each made up of a plurality of detachable sections having plane inner surfaces and reinforced upon their outer surfaces, and, as shown in Fig. 2, a plurality of these molds may be used in superposed relation in building a silo, grain elevator or other tall tubular structure, the lower mold being adapted to be detached and moved to a position above those higher up as the concrete wall formed between the mold walls becomes hardened, thus enabling the progressive building of tall cement or concrete structures.

To expand the outer mold wall 1 and to contract the inner mold wall 5 so that the mold may be disengaged from the formed cement wall of the structure and then moved up to alternate with other molds and form succeeding portions of the cement structure, a guiding and connecting bar or member 9 is secured within one end of the channel bars 3 of the outer wall sections and a like connecting bar is secured within one end of the channel bars 7 of each inner wall section, the free ends of said bars 9 projecting into the adjacent open ends of the channel bars of an adjacent section to slide freely therein but being of a width to fit within said channels which thus form guides for said bars 9, said bars thus forming guiding and connecting members for adjacent sections and by their engagement within the channels, hold the sections in alignment while permitting free relative movement of the sections in the contracting or expanding movements of the mold walls. To draw the ends of adjacent sections toward each other or force them apart, each bar 9 is made in the form of a rack bar or provided with teeth on its outer side to be engaged by a pinion 10, the two pinions for the upper and lower rack bars of each section, being secured upon the ends of a vertical shaft 11 which is mounted in suitable bearings 12 secured to the inner flanges of the ends of the channel bars 7 of the inner wall and the channel bars 3 of the outer wall, within which ends the racks slide. The racks are thus carried by one section and the pinions are mounted upon the adjacent section so that by turning the upper pinion of one of the pairs of pinions secured to one of the shafts 11, the racks engaged with said pinions will be moved longitudinally, and the mold wall sections will be drawn toward each other or forced apart according to the direction in which the pinions are turned by means of a suitable tool or wrench (not shown) inserted in a rectangular bore or opening 13 in the upper end of the upper pinion. To lock the sections in expanded or contracted position, openings are provided in the flanges of the channel bars to receive pins 14 and 15, the pin 14 extending through the upper flange of the lower channel into engagement with the teeth of the rack and held by gravity, and the pin 15 extending upwardly through the lower flange of the upper channel and held in engagement with the teeth of the rack by means of a spring 16 sleeved on the pin. The locking pins may be engaged with the rack in any suitable manner as by providing an opening or notch in the rack or permitting the pins to engage the teeth as shown.

When the inner wall sections are expanded into operative position, there is a space between their adjacent ends, this space being provided so that the sections may be contracted or moved toward each other to permit the removal of the inner wall of the mold from the molded concrete wall. To close this space, an apron 17 comprising a strip of sheet metal, is provided to engage the inner surface of the wall sections and span the space between them. This apron is supported in operative position and at the same time strengthened against buckling under the pressure of the concrete, by means of a longitudinal strip 18 secured to the apron at its middle portion, the strip being turned at right angles at its upper end to provide a lug 19 adapted to engage over the rack bar 9. The apron is thus suspended from the upper rack bar in proper position to cover the gap between the adjacent ends of the wall sections.

When a plurality of molds are employed in building a tall structure, these molds are superposed and in order that they be perfectly aligned, openings are provided in the flanges of the channel bars 3 and 7 to receive rods 20 which are preferably formed at one end with a handle portion 21 by means of which they may be inserted through the openings in the flanges of the lower channel bar of one mold section into engagement with like openings in the flanges of the channel of a section below. If found desirable these rods may be of considerable length and may be held in position against the walls of the mold sections by a suitable hanger or loop 22 secured to the wall. As shown in Fig. 2, when the molds are in superposed relation and in position for building successive portions of a concrete structure, in order that the racks and pinions of the lower mold may be readily operated to expand or contract the wall sections and thus permit the removal of a lower mold and the raising of the same upwardly past the upper mold, the racks and pinions on the lower mold are preferably attached in a reverse position to those on the upper mold so that the gears 10 will be in staggered relation to those carried by the upper mold and thus permit of the engagement of a suitable tool or wrench with the gears of the lower mold from a position above the upper mold.

In Fig. 1 the molds are shown as arranged for building a concrete silo and in these structures it is desirable to form the concrete wall with a laterally extending portion providing a hollow flue or chute which opens into the interior of the structure. In order to form the wall with such lateral projections, the outer mold wall 1 has separate sections 23 which are properly shaped to give the desired contour to the concrete wall. These sections 23 are connected in the same manner as the section 2 and are formed with a sheet metal body and reinforcing frame work of channel bars and angle irons. The same construction of mechanism for contracting and expanding the sections is provided, comprising the rack bars and pinions. The lateral chute forming the vertical passage-way 24 is formed by providing inner mold wall sections 25 which are similar in construction to the sections 5 and in a like manner are contracted and expanded by means of the rack bars and pinions. It is desirable in a concrete structure of this character, to reinforce the sides of the opening of the chute 24 into the body of the structure and further to provide rods or members extending across this opening which may be used as a ladder up which a person may climb within the chute 24. Angle bars 26 are set adjacent to the inner end of the wall formed by the sections 25 and these angle bars carry a series of rods 27 having curved end portions 28 which lie within the concrete wall after the structure is formed with the ends of the rods projecting through openings in the angle bars 26 and secured therein. The angle bars form a reinforcement for the concrete wall and at the same time provide ways for the usual series of doors for closing the entrance into the chute 24. These angle bars 26 are held in place by the rods 27 which themselves are embedded in the concrete wall and extending across the chute 24 provide a further reinforcement and also serve as the rungs of a ladder.

In Fig. 6 of the drawings, a modified construction of expanding and contracting mechanism is shown. A bar 29 extends across this space between the adjacent ends of the channel member 7 and is adapted to slide freely within said channel members at each end. Intermediate its ends, this bar carries a bearing member 30 for a screw shaft 31 which shaft engages nuts 32 pivotally attached as at 33 to the flanges of the channel members 7. Between suitable flanges 34 on the bearing member 30, is a nut or head 35 on the shaft 31 so that by turning this head which is secured to the shaft, the shaft is rotated and by reason of its screw-threaded engagement with the nuts 32, the ends of the channel bars and therefore the two mold sections are moved toward or away from each other.

By the construction shown, molds are provided by means of which a tall structure of any desired configuration may be made by alternately moving the molds to positions one above the other as the forming of the structure progresses upwardly, the operation of detaching and replacing the molds being facilitated by the arrangement of mechanism for contracting and expanding the mold walls. A very rigid mold structure is secured by the construction shown and several molds may be used and held in perfect rigid alignment for the purpose of building up a concrete structure.

Obviously changes may be made in the construction and arrangement of parts within the scope of the appended claims without departing from the spirit of the invention, and I do not therefore limit myself to the particular construction or arrangement of parts shown.

Having thus fully described my invention, what I claim is:

1. In a mold for concrete structures, the combination of a plurality of wall sections, a horizontally disposed channel iron member secured to each section, a guide member engaged within the channels of said channel member, a plate overlapping the edges of adjacent sections and suspended from said guide member and means for moving the sections relatively toward and from each other.

2. In a mold for concrete structures, the combination of a pluarlity of wall sections each comprising a sheet metal body and a channel iron secured to the body at the upper and lower edges thereof, a guide member spanning the space between adjacent sections and slidable within said channel members, a plate overlapping the edges of adjacent sections and closing the space therebetween, and a longitudinally extending strengthening strip secured to each plate at the central portion thereof and having an inbent end to engage the guide member, and means for moving the sections relatively toward and from each other.

3. In a mold for concrete structures, the combination of a plurality of wall sections each provided with a horizontally extending channel iron secured to the upper and lower edges thereof, guide bars slidable in the channels of the channel irons and spanning the space between adjacent sections, plates overlapping the edges of adjacent sections in engagement with the inner surface of said sections. means for holding the plates in position relative to said sections, and means for moving the sections relatively.

4. In a mold for concrete structures, the combination of a plurality of superposed wall sections, channel irons secured to said sections along the upper and lower edges thereof, rack bars engaging the channel irons of each section, pinions engaging the rack bars of each section, and a common shaft for the pinions of each section, the shaft of one section being positioned out of alinement with the shafts of the sections above and below.

In testimony whereof I affix my signature in the presence of two witnesses.

HENRY G. SELLMAN.

Witnesses:
LEWIS E. FLANDERS,
ANNA M. DORR.